(12) United States Patent
Dutt et al.

(10) Patent No.: US 11,836,646 B2
(45) Date of Patent: Dec. 5, 2023

(54) EFFICIENTLY CONSTRUCTING REGRESSION MODELS FOR SELECTIVITY ESTIMATION

(71) Applicant: Microsoft Technology Licensing, LLC, Redmond, WA (US)

(72) Inventors: Anshuman Dutt, Sammamish, WA (US); Chi Wang, Redmond, WA (US); Vivek Ravindranath Narasayya, Redmond, WA (US); Surajit Chaudhuri, Kirkland, WA (US)

(73) Assignee: MICROSOFT TECHNOLOGY LICENSING, LLC, Redmond, UT (US)

( * ) Notice: Subject to any disclaimer, the term of this patent is extended or adjusted under 35 U.S.C. 154(b) by 658 days.

(21) Appl. No.: 16/917,857

(22) Filed: Jun. 30, 2020

(65) Prior Publication Data
US 2021/0406744 A1 Dec. 30, 2021

(51) Int. Cl.
G06N 7/00 (2023.01)
G06N 7/01 (2023.01)
G06N 20/00 (2019.01)
G06F 18/214 (2023.01)
G06F 18/21 (2023.01)

(52) U.S. Cl.
CPC ............ *G06N 7/01* (2023.01); *G06F 18/214* (2023.01); *G06F 18/217* (2023.01); *G06N 20/00* (2019.01)

(58) Field of Classification Search
CPC ................................ H04L 63/20; G06N 20/00
See application file for complete search history.

(56) References Cited

FOREIGN PATENT DOCUMENTS

CN 110765458 A * 2/2020 ........... G06F 21/563

OTHER PUBLICATIONS

Anshuman Dutt et al., "Selectivity estimation for range predicates using lightweight models", Proceedings of the VLDB Endowment [ACM Digital Library], Assoc. of Computing Machinery, New York, NY, vol. 12, No. 9, May 2019, pp. 1044-1057 (Year: 2019).*
"International Search Report and Written Opinion Issued in PCT Application No. PCT/US21/031469", dated Jul. 21, 2021, 12 Pages.

(Continued)

*Primary Examiner* — Hee K Song
(74) *Attorney, Agent, or Firm* — RAY QUINNEY & NEBEKER; Tiffany Healy

(57) ABSTRACT

A model generator constructs a model for estimating selectivity of database operations by determining a number of training examples necessary for the model to achieve a target accuracy and by generating approximate selectivity labels for the training examples. The model generator may train the model on an initial number of training examples using cross-validation. The model generator may determine whether the model satisfies the target accuracy and iteratively and geometrically increase the number of training examples based on an optimized geometric step size (which may minimize model construction time) until the model achieves the target accuracy based on a defined confidence level. The model generator may generate labels using a subset of tuples from an intermediate query expression. The model generator may iteratively increase a size of the subset of tuples used until a relative error of the generated labels is below a target threshold.

20 Claims, 7 Drawing Sheets

(56) References Cited

OTHER PUBLICATIONS

Hasan, et al., "Multi-Attribute Selectivity Estimation Using Deep Learning", In Repository of https://arxiv.org/abs/1903.09999v1, Mar. 24, 2019, 14 Pages.

Wang, et al., "Monotonic Cardinality Estimation of Similarity Selection: A Deep Learning Approach", In Repository of https://arxiv.org/abs/2002.06442v1, Feb. 15, 2020, 22 Pages.

"How the Planner Uses Statistics", Retrieved from: https://web.archive.org/web/20190222215931/https://www.postgresql.org/docs/current/row-estimation-examples.html, Feb. 22, 2019, 5 Pages.

"Optimizer Statistics", Retrieved from: https://docs.oracle.com/en/database/oracle/oracle-database/18/tgsql/optimizer-statistics.html#GUID-0A2F3D52-A135-43E1-9CAB-55BFE068A297, Retrieved on Apr. 20, 2020, 2 Pages.

Aboulnaga, et al., "Self-Tuning Histograms: Building Histograms without Looking at Data", In Proceedings of the ACM SIGMOD Record, vol. 28, No. 2, Jun. 1, 1999, pp. 181-192.

Acharya, et al., "Join Synopses for Approximate Query Answering", In Proceedings of the ACM SIGMOD International Conference on Management of Data, Jun. 1, 1999, pp. 275-286.

Agarwal, et al., "BlinkDB: Queries with Bounded Errors and Bounded Response Times on Very Large Data", In Proceedings of the 8th ACM European Conference on Computer Systems, Apr. 15, 2013, pp. 29-42.

Babcock, et al., "Dynamic Sample Selection for Approximate Query Processing", In Proceedings of the ACM SIGMOD International Conference on Management of Data, Jun. 9, 2003, pp. 539-550.

Bruno, et al., "Efficient Creation of Statistics over Query Expressions", In Proceedings of the 19th International Conference on Data Engineering, Mar. 5, 2003, 12 Pages.

Bruno, et al., "Exploiting Statistics on Query Expressions for Optimization", In Proceedings of the ACM SIGMOD International Conference on Management of Data, Jun. 4, 2002, pp. 263-274.

Bruno, et al., "STHoles: A Multidimensional Workload-Aware Histogram", In Proceedings of the ACM SIGMOD International Conference on Management of Data, May 21, 2001, pp. 211-222.

Chaudhuri, et al., "A Pay-As-You-Go Framework for Query Execution Feedback", In Proceedings of the VLDB Endowment, vol. 1, No. 1, Aug. 23, 2008, pp. 1141-1152.

Chaudhuri, et al., "On Random Sampling over Joins", In Proceedings of the ACM SIGMOD Record, vol. 28, No. 2, Jun. 1, 1999, 12 Pages.

Chaudhuri, Surajit, "Query Optimizers: Time to Rethink the Contract?", In Proceedings of the ACM SIGMOD International Conference on Management of Data, Jun. 29, 2009, pp. 961-968.

Chen, et al., "Two-Level Sampling for Join Size Estimation", In Proceedings of the ACM International Conference on Management of Data, May 14, 2017, pp. 759-774.

Chen, et al., "XGBoost: A Scalable Tree Boosting System", In Proceedings of the 22nd ACM SIGKDD International Conference on Knowledge Discovery and Data Mining, Aug. 13, 2016, 10 Pages.

Cormode, et al., "Synopses for Massive Data: Samples, Histograms, Wavelets, Sketches", In Foundations and Trends in Databases, vol. 4, No. 1-3, Jan. 1, 2012, 296 Pages.

Dutt, et al., "Selectivity Estimation for Range Predicates using Lightweight Models", In Proceedings of the VLDB Endowment, vol. 12, No. 9, May 1, 2019, pp. 1044-1057.

Estan, et al., "End-biased Samples for Join Cardinality Estimation", In Proceedings of the 22nd International Conference on Data Engineering, Apr. 3, 2006, 14 Pages.

Galindo-Legaria, et al., "Statistics on Views", In Proceedings of the 29th VLDB Conference, Jan. 1, 2003, 11 Pages.

Getoor, et al., "Selectivity Estimation using Probabilistic Models", In Proceedings of the ACM SIGMOD International Conference on Management of Data, May 21, 2001, 12 Pages.

Heimel, et al., "Self-Tuning, GPU-Accelerated Kernel Density Models for Multidimensional Selectivity Estimation", In Proceedings of the ACM SIGMOD International Conference on Management of Data, May 31, 2015, pp. 1477-1492.

Huang, et al., "Efficient Identification of Approximate Best Configuration of Training in Large Datasets", In Proceedings of the 33rd AAAI Conference on Artificial Intelligence, Jul. 17, 2019, pp. 3862-3869.

Ke, et al., "LightGBM: A Highly Efficient Gradient Boosting Decision Tree", In Proceedings of the 31st International Conference on Neural Information Processing Systems, Dec. 4, 2017, 9 Pages.

Kipf, Andreas, "Learned Cardinalities in PyTorch", Retrieved from: https://github.com/andreaskipf/learnedcardinalities, May 6, 2019, 3 Pages.

Kipf, et al., "Learned Cardinalities: Estimating Correlated Joins with Deep Learning", In Proceedings of 9th Biennial Conference on Innovative Data Systems Research, Jan. 13, 2019, 8 Pages.

Kursa, et al., "Feature Selection with the Boruta Package", In Journal of Statistical Software, vol. 36, No. 11, Sep. 16, 2010, 13 Pages.

Lakshmi, et al., "Selectivity Estimation in Extensible Databases—A Neural Network Approach", In Proceedings of the 24th VLDB Conference, Aug. 24, 1998, pp. 623-627.

Leis, et al., "Cardinality Estimation Done Right: Index-Based Join Sampling", In Proceedings of 8th Biennial Conference on Innovative Data Systems Research, Jan. 8, 2017, 8 Pages.

Leis, et al., "Query Optimization through the Looking Glass, and What We Found Running the Join Order Benchmark", In VLDB Journal, vol. 27, No. 5, Sep. 18, 2017, pp. 643-668.

Liu, et al., "Cardinality Estimation Using Neural Networks", In Proceedings of the 25th Annual International Conference on Computer Science and Software Engineering, Nov. 2, 2015, pp. 53-59.

Lopes, et al., "Statistics", Retrieved from: https://docs.microsoft.com/en-us/sql/relational-databases/statistics/statistics?view=sql-server-2017, Jun. 3, 2020, 19 Pages.

Malik, et al., "A Black-Box Approach to Query Cardinality Estimation", In Proceedings of the 3rd Biennial Conference on Innovative Data Systems Research, Jan. 7, 2007, pp. 56-67.

Moerkotte, et al., "Exploiting Ordered Dictionaries to Efficiently Construct Histograms with Q-Error Guarantees in SAP HANA", In Proceedings of the ACM SIGMOD International Conference on Management of Data, Jun. 18, 2014, pp. 361-372.

Moerkotte, et al., "Preventing Bad Plans by Bounding the Impact of Cardinality Estimation Errors", In Proceedings of the VLDB Endowment, vol. 2, Issue 1, Aug. 24, 2009, pp. 982-993.

Moody, John, "Fast Learning in Multi-Resolution Hierarchies", In Journal of Advances in Neural Information Processing Systems, 1989, pp. 29-39.

Muller, et al., "Improved Selectivity Estimation by Combining Knowledge from Sampling and Synopses", In Proceedings of the VLDB Endowment, vol. 11, No. 9, May 1, 2018 pp. 1016-1028.

Nambiar, et al., "The Making of TPC-DS", In Proceedings of the VLDB, vol. 6, Sep. 12, 2006, 10 Pages.

Provost, et al., "Efficient Progressive Sampling", In Proceedings of the 5th ACM SIGKDD International Conference on Knowledge Discovery and Data Mining, Aug. 1, 1999, pp. 23-32.

Selinger, et al., "Access Path Selection in a Relational Database Management System", In Proceedings of the ACM SIGMOD International Conference on Management of Data, May 30, 1979, pp. 23-34.

Settles, Burr, "Active Learning Literature Survey", In Computer Sciences Technical Report 1648, University of Wisconsin—Madison, Jan. 26, 2009, 67 Pages.

Srivastava, et al., "ISOMER: Consistent Histogram Construction Using Query Feedback", In Proceedings of 22nd International Conference on Data Engineering, Apr. 3, 2006, 13 Pages.

Stillger, et al., "LEO—DB2's Learning Optimizer", In Proceedings of the 27th International Conference on Very Large Data Bases, vol. 1, Sep. 11, 2001, 10 Pages.

Tzoumas, et al., "Efficiently Adapting Graphical Models for Selectivity Estimation", In the VLDB Journal, vol. 22, No. 1, Feb. 1, 2013, pp. 3-27.

Vengerov, et al., "Join Size Estimation Subject to Filter Conditions", In Proceedings of the VLDB Endowment, vol. 8, No. 12, Aug. 31, 2015, pp. 1530-1541.

(56) References Cited

OTHER PUBLICATIONS

Vitter, Jeffrey Scott, "Random Sampling with a Reservoir", In ACM Transactions on Mathematical Software, vol. 11, No. 1, Mar. 1, 1985, pp. 37-57.

Woltmann, et al., "Cardinality Estimation with Local Deep Learning Models", In Proceedings of the 2nd International Workshop on Exploiting Artificial Intelligence Techniques for Data Management, Jul. 5, 2019, 8 Pages.

Wu, et al., "Towards a Learning Optimizer for Shared Clouds", In Proceedings of the VLDB Endowment, vol. 12, No. 3, Nov. 1, 2018, pp. 210-222.

Yang, et al., "Deep Unsupervised Cardinality Estimation", In Proceedings of the VLDB Endowment, vol. 13, No. 3, Nov. 1, 2019, pp. 279-292.

Yu, et al., "CS2: A New Database Synopsis for Query Estimation", In Proceedings of the ACM SIGMOD International Conference on Management of Data, Jun. 22, 2013, pp. 469-480.

\* cited by examiner

EFFICIENTLY CONSTRUCTING REGRESSION MODELS FOR SELECTIVITY ESTIMATION

CROSS-REFERENCE TO RELATED APPLICATIONS

N/A

BACKGROUND

A database may be an organized collection of data. The database may be a relational database that includes one or more tables. Each table may include one or more records that may be organized as rows of the table. A user may request information from the database using a query. Executing the query may involve performing more than one database operation. Database operations may include filtering, joining, or selecting tables or records.

A query optimizer may identify an execution plan for performing a query on a database system. The efficiency of an execution plan may be measured in terms of an amount of time required to execute the plan. The query optimizer's ability to select a quality execution plan may depend heavily on the query optimizer accurately estimating an output size of intermediate stages of a possible execution plan. Furthermore, for the query optimizer to efficiently select a quality execution plan, the query optimizer must estimate the output within a small estimation time.

A query optimizer may reduce estimation overhead by using table-level statistics and attribute-level statistics to estimate output sizes for intermediate database operations. These techniques may offer small space and time overhead and low construction overhead. But these techniques may be prone to large estimation errors when correlations are present among various query predicates. These techniques may therefore choose execution plans orders of magnitude slower than an optimal execution plan.

SUMMARY

In accordance with one aspect of the present disclosure, a method is disclosed for generating a model achieving a target accuracy. The method includes training the model on training data using cross-validation. The training data has a size and the size equals a number of labeled examples in the training data. The method further includes computing a confidence interval estimating an accuracy of the model. The confidence interval has a lower bound and an upper bound. The method further includes determining whether the target accuracy is less than or equal to the lower bound and returning the model if the target accuracy is less than or equal to the lower bound.

The method may further include determining a geometric step size for increasing the size of the training data. The geometric step size may minimize the total time spent on model construction. Determining the geometric step size may comprise determining a labeling cost. The labeling cost may be a time required to compute a label for one example. Determining the geometric step size may comprise determining a cross-validation cost. The cross-validation cost may be a time required to run a cross-validation for one example. Determining the geometric step size may comprise computing a ratio of the labeling cost to the cross-validation cost. The geometric step size may be based on the ratio. The method may further include adding, if the target accuracy falls between the upper bound and the lower bound, additional labeled examples to the training data to generate updated training data. The updated training data may have an updated size equal to the size plus a number of the additional labeled examples. The method may further include training the model on the updated training data using cross-validation. The method may further include computing, after training the model on the updated training data, an updated confidence interval for the model. The updated confidence interval may have an updated lower bound and an updated upper bound. The method may further include determining, after training the model on the updated training data, whether the target accuracy is less than or equal to the updated lower bound. The method may further include returning the model if the target accuracy is less than or equal to the updated lower bound.

The additional labeled examples may have true labels.

The additional labeled examples may have approximate labels.

Adding the additional labeled examples to the training data may include determining the approximate labels for the additional labeled examples.

The target accuracy may be a target percentile of example predictions having a q-error less than a target q-error.

The confidence interval may be based on a confidence significance level.

The method may further include determining whether the target accuracy is greater than or equal to the upper bound, training the model on a maximum number of labeled examples if the target accuracy is greater than or equal to the upper bound, and returning the model trained on the maximum number of labeled examples.

The model may be a regression model and the training data may include queries and associated selectivity labels.

In accordance with another aspect of the present disclosure, a method is disclosed for generating approximate labels for a set of training queries. The method includes obtaining a set of random tuples from an intermediate query expression. The set of random tuples includes a number of tuples less than a total number of tuples from the intermediate query expression. The method further includes determining the approximate labels for the set of training queries based on the set of random tuples. The method further includes determining, for each query in the set of training queries, a confidence probability for the query to achieve an error threshold. The method further includes removing queries from the set of training queries that have a confidence probability above a probability threshold, determining whether the set of training queries is empty, and returning the approximate labels if the set of training queries is empty.

The method may further include obtaining a second set of random tuples from the intermediate query expression. The second set of random tuples may not overlap with the set of random tuples and may have a same size as the set of random tuples. The method may further include updating the approximate labels for each query in the set of training queries based on the second set of random tuples. The method may further include updating, for each query in the set of training queries, the confidence probability for the query to achieve the error threshold. The method may further include removing queries from the set of training queries that have a confidence probability above the probability threshold.

The method may further include determining whether a maximum number of tuples have been obtained and returning the approximate labels if the maximum number of tuples have been obtained.

The method may further include determining whether all tuples from the intermediate query expression have been obtained and returning the approximate labels if all tuples from the intermediate query expression have been obtained.

The error threshold may be a q-error threshold.

The approximate labels may be approximate selectivity labels.

In accordance with another aspect of the present disclosure, a system is disclosed that includes one or more processors, memory in electronic communication with the one or more processors, and instructions stored in the memory. The instructions may be executable by the one or more processors to train a model on a set of labeled training examples using cross-validation. The set of labeled training examples may have a size. The instructions may be further executable by the one or more processors to determine that the model does not satisfy an accuracy target, increase the size of the set of labeled training examples to a new size, generate labels for additional training examples needed to increase the size of the set of labeled training examples to the new size, add the additional training examples and the generated labels to the set of labeled training examples, and train the model on the set of labeled training examples using cross-validation.

The instructions may be further executable by the one or more processors to determine a geometric step size for increasing the size of the set of labeled training examples. The geometric step size may minimize the total time spent on model construction. Determining the geometric step size may include determining a labeling cost. The labeling cost may be a time required to compute a label for one example. Determining the geometric step size may also include determining a cross-validation cost. The cross-validation cost may be a time required to run a cross-validation for one example. Determining the geometric step size may also include computing a ratio of the labeling cost to the cross-validation cost. The geometric step size may be based on the ratio.

Determining that the model does not satisfy the accuracy target may include computing a confidence interval for the model. The confidence interval may have a lower bound and an upper bound and represents that, with a confidence significance level, a percentile of predictions of the model that have a q-error less than a target q-error is between the lower bound and the upper bound. Determining that the model does not satisfy the accuracy target may also include determining that a target percentile is between the lower bound and the upper bound.

Generating the labels for the additional training examples may include obtaining a set of random tuples from an intermediate query expression. The set of random tuples may be less than a total number of tuples from the intermediate query expression. Generating the labels for the additional training examples may also include determining approximate labels for the additional training examples based on the set of random tuples, determining confidence probabilities for the additional training examples to achieve an error threshold, identifying one or more examples of the additional training examples that have a confidence probability above a probability threshold, and obtaining a second set of random tuples from the intermediate query expression. The second set of random tuples may not overlap with the set of random tuples. Generating the labels for the additional training examples may also include updating the approximate labels for the one or more examples of the additional training examples.

The approximate labels may be approximate selectivity labels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
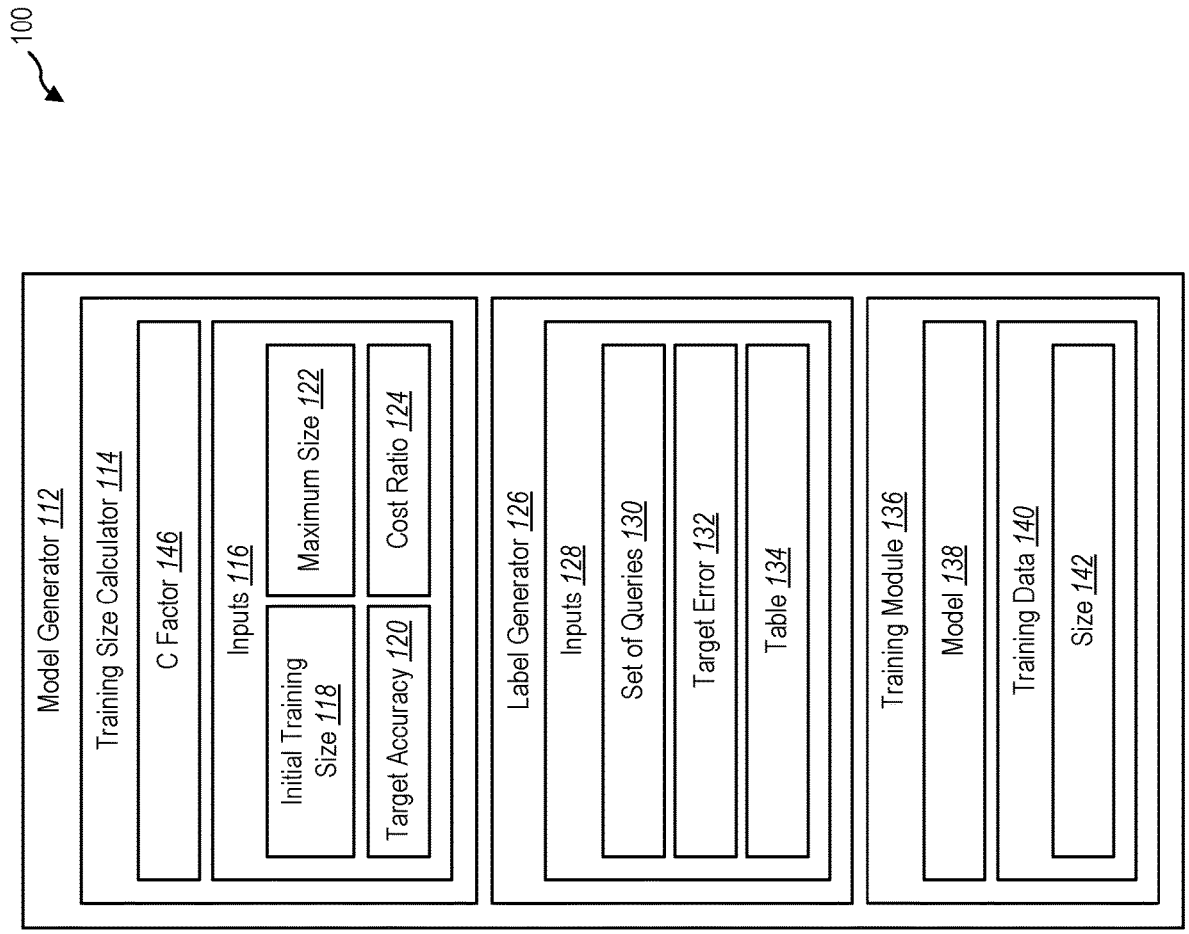
FIG. 1 illustrates an example system for generating an optimized execution plan for a query.
Figure 1:
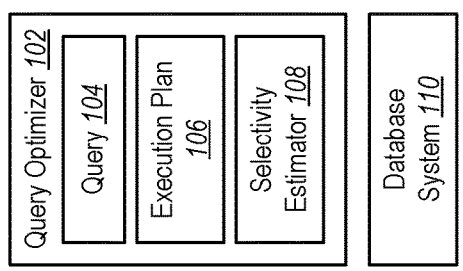

This disclosure concerns a model generator that efficiently generates a regression model for estimating the selectivity of performing database query operations. The model generator may efficiently generate the model to meet a target accuracy. The model generator may do so even when adequate labeled training examples are not available. To generate the model the model generator may (1) iteratively increase a size of training data until the model achieves the target accuracy and (2) generate, based on a subset of database data, approximate selectivity labels for training examples needed to train the model. In generating the approximate selectivity labels, the model generator may iteratively increase a size of the subset of database data used to generate the approximate selectivity labels until the approximate selectivity labels satisfy a relative error threshold. A query optimizer may use selectivity estimates produced by the model to determine an efficient plan for executing a query on one or more databases and may allow the query optimizer to determine efficient execution plans even when there are correlations between intermediate database operations.

A database may be an organized collection of data. The database may be a relational database that includes one or more tables. Each table may include one or more records that may be organized as rows or tuples of the table. A user may request information from the database using a query. Executing the query may involve performing more than one database operation. Database operations may include filtering, joining, or selecting tables or records.

A query optimizer may identify an execution plan for performing a query on a database system. The query optimizer may use selectivity estimates to formulate and select an efficient execution plan. The efficiency of an execution plan may be measured in terms of an amount of time required to execute the plan. Selectivity may be a measure of an output size of performing a database operation, i.e., a measure of the number of records or rows that satisfy the criteria of a database operation. There may be at least two ways to measure selectivity. First, selectivity may be measured using a fraction or ratio. Assume a table includes 100 rows. Assume that 50 of the rows satisfy the criteria of a filter operation. The selectivity of the filter operation may be ½. Second, selectivity may be measured using a raw total. Consider a join operation performed on two tables. Assume that after filter operations have been performed on the two tables, each table has 30 rows that may be joined. Assume that 10 total rows satisfy the join criteria. The selectivity for the join operation may be 10.

The query optimizer's ability to select a quality execution plan may depend heavily on the query optimizer using accurate estimates of the output size (i.e., the selectivity) of intermediate stages of a possible execution plan. Furthermore, for the query optimizer to efficiently select a quality execution plan, the query optimizer must estimate the output within a small estimation time.

To reduce estimation overhead most existing optimizers use table-level statistics (such as row count) and attribute-level statistics (such as null count, distinct count, and histograms) to derive selectivity estimates for intermediate expressions (such as filters and joins). These techniques rely on a set of assumptions, including attribute value independence (AVI), join containment, and uniform value distribution. These techniques may offer small space and time overhead and low construction overhead. But limited statistics do not capture correlations across query predicates. As a result, these techniques are prone to large estimation errors when correlations are present among various query predicates, such as between two filter predicates or between filter and join predicates. These techniques may therefore choose execution plans orders of magnitude slower than an optimal execution plan.

Using a supervised learning model may improve selectivity estimation. A supervised learning model may be a machine learning algorithm trained on a set of training data to perform a desired function. The desired function may be calculating selectivity estimates. The learning data may be a set of labeled examples. The examples may be example queries or database operations. The label for each example may be a selectivity for the query or database operation. Thus, constructing a supervised learning model for selectivity estimation may involve training a model on a set of example queries with associated selectivity labels. Once trained, the supervised learning model may receive a query and provide a selectivity estimate for the query. The supervised learning model may be a regression model. A regression model may be useful because regression models may capture data correlations to provide significantly better accuracy compared to traditional techniques. Furthermore, regression models may do so while keeping low estimation overhead. Through use of a supervised learning model, a query optimizer may efficiently and accurately estimate selectivities for intermediate query operations.

But generating the supervised learning model presents challenges. As noted above, constructing a supervised model that can estimate a selectivity for a given query expression may have two components: (1) collecting or generating training examples with selectivity labels, and (2) using the labeled examples to train the supervised model. Training a model on tens of thousands of examples may take only a few seconds. But the time required to collect a sufficiently large labeled training dataset can be enormous. Past execution logs may serve as a source of training data. But it may be difficult to find sufficient examples for each query expression encountered during query optimization to adequately train the model. Execution logs contain examples for query expressions that appear in final execution plans. But those expressions are a small fraction of all query expressions that a query optimizer may consider during the optimization process. Synthetically generating training examples may take hours, especially for large datasets where true selectivity computation is costly.

The disclosed systems and methods reduce the cost of (i.e., the time for) constructing supervised learning models. The cost of constructing the supervised learning model may depend on two factors: (1) the size of training data (i.e., the number of examples) needed to train the model and (2) the cost to generate a label for each example needed to train the model. The disclosed systems and methods may significantly reduce overhead due to both of these factors.

Increasing the number of examples used to train a model generally leads to better prediction accuracy. But it also increases model construction cost. On the other hand, training with too few examples may significantly compromise model accuracy. The optimal training size ($s^*$) may be a smallest number of examples such that the trained model reaches a target prediction accuracy (which may also be referred to as a target accuracy). It may be that $s^*$ varies across different query expressions.

A model generator and a training size calculator may efficiently determine a training data size that allows a model to satisfy a defined target accuracy. To avoid generating more training examples than necessary (and thus unnecessarily increasing the cost of generating the model) the training size calculator may use an iterative approach for model construction. The training size calculator may begin with an initial number of examples and determine whether a model trained on those examples satisfies the target accuracy. If the model does not satisfy the target accuracy, the training size calculator may iteratively generate additional examples for model training until the model achieves the target accuracy.

The training size calculator may increase the number of training examples in a geometric fashion. The training size calculator may determine an optimal geometric step size, which may be a function of the per-example cost ratio between label generation and model training. For example, the optimal geometric step size may depend on the ratio between label generation cost and cross-validation cost. The iterative training method may have a constant-ratio approximation guarantee of optimality on the total model construction cost.

The training size calculator may use cross-validation and a computed confidence interval to estimate model accuracy and determine whether the model satisfies the target accuracy. Cross-validation may be a procedure for estimating an accuracy of a machine learning model using a given training data. A confidence interval may be a range of values bounded by an upper bound and a lower bound. The confidence interval may be computed for a defined confidence level. The confidence interval may be an estimate of a range of values for a parameter with an unknown value and signify that, with the defined confidence level, the unknown value is actually within the estimated range of values. The confidence interval of a machine learning model calculated by the training size calculator may represent that, with a given confidence level, actual accuracy of the machine learning model (which is unknown) falls within the confidence interval. Thus, the confidence interval may be an estimate of an unknown error of the machine learning model on test data.

The training size calculator may use a specific accuracy metric called q-error. Q-error may be the larger of two ratios calculated using an estimated selectivity and an actual selectivity. The first ratio may be estimated selectivity to actual selectivity. The second ratio may be actual selectivity to estimated selectivity.

The training size calculator may use a target percentile for measuring accuracy of a machine learning model. The training size calculator may compute a percentage of examples that have an error (such as a q-error) that satisfies a target error and then compare that percentage to the target percentile. For example, assume the target percentile is 95%. In determining whether the model satisfies the target accuracy, the model generator may determine whether 95% of the examples satisfy the target error.

In determining whether a model satisfies a target accuracy, the training size calculator may compute a confidence interval for a percentage of example predictions that are below an error threshold and determine whether the target percentile is equal to or below a lower bound of the confidence interval. If the target percentile is equal to or below the lower bound, the unknown actual percentage of example predictions below an error threshold is, with a probability of a defined confidence level, larger than the target percentile. Therefore, the training size calculator may stop adding additional training examples to the training data and return the model. If the target percentile is above the lower bound of the confidence interval, the training size calculator may determine whether the target percentile is equal to or above the upper bound of the confidence interval. The training size calculator may also determine whether the target percentile is contained in the confidence interval. If the target percentile is above the upper bound, the training size calculator may use a maximum training data size and return a best model for that size. If the target percentile is contained in the confidence interval, the training size calculator may geometrically increase the size of the training data. The training size calculator may use a label generator (described in more detail below) to generate the additional examples needed to expand the size of the training data. After adding the additional examples to the training data, the training size calculator may execute another iteration of training the model, running cross-validation, computing a confidence interval, and comparing the target percentile to the confidence interval.

Through use of the label generator, the model generator and the training size calculator may efficiently determine a size of training data and train a model even when sufficient labeled examples are not available. The model generator and the training size calculator may assume sufficient examples are not available at the outset and that generating training data is the dominant cost component to generating the model.

Generating a selectivity label for a single query may be expensive for large datasets. As a result, the model generator may use approximate selectivity labels for model training. Doing so may reduce the cost of generating additional training data in each iteration of the training size calculator. The model generator may use approximate selectivity labels based on the assumption that small errors in the model predictions (e.g., q-error<2) can be tolerated. The label generator may generate the approximate selectivity labels.

The label generator may receive a set of unlabeled training examples and an error threshold as input. The label generator may use a uniform random data sample of an intermediate query expression to estimate selectivity labels for the set of unlabeled training examples. The label generator may iteratively increase the size of the uniform random data sample to progressively refine a probabilistic estimate of selectivity labels until the label generator determines that the selectivity labels satisfy the error threshold. Stated another way, the label generator may generate approximate selectivity labels for training queries using a sample of an intermediate query expression rather than the full intermediate query expression. And the label generator may use progressively larger samples of the intermediate query expression until the approximate selectivity labels satisfy the error threshold. In general, the larger the selectivity of a query, the smaller the sample size required to produce its approximate label for a given relative error bound. To control the adverse impact on model accuracy the label generator may use a small relative error threshold during selectivity approximation. The label generator may target to a bounded q-error instead of absolute error.

The model generator may produce regression models with only 16 KB memory that can deliver 10-100× better 95th percentile error values as compared to traditional techniques such as histograms and join-samples. Furthermore, these 16 KB regression models may deliver accuracy comparable to custom-designed supervised models with a much larger number of model parameters. The model construction improvements bring 10× or more savings for a large fraction of expressions compared to existing training methods. Finally, injected estimates may bring improvement similar to injecting true selectivities.

FIG. 1 illustrates an example system 100. The system 100 may efficiently generate a model that estimates a selectivity for a query and use estimates produced by the model to generate optimized execution plans. The system 100 may include a database system 110, a query optimizer 102, and a model generator 112.

The database system 110 may include one or more databases containing data. The one or more databases may be relational databases in which the data is organized in tables.

The query optimizer 102 may receive a query 104. The query optimizer 102 may determine an execution plan 106 for performing the query 104 on the database system 110. The execution plan 106 may include multiple database operations, such as filters and joins. It may be that a large number of different operations or combinations of operations could be used to execute the query 104. But some combinations of operations may be faster than other combinations. The query optimizer 102 may estimate a cost of multiple different combinations. The cost may be an amount of time required to perform the combination of operations. The query optimizer 102 may select an optimal combination of operations as the execution plan 106. The optimal combination of operations may be the combination of operations that takes the least amount of time to execute. The optimal combination of operations may be a combination of operations that takes less time to execute than one or more other combinations of operations.

Choosing an optimal execution plan may require accurate selectivity estimates for intermediate operations included in the execution plan. A selectivity of an operation may be a measure of how many rows satisfy criteria specified by the operation. The query optimizer 102 may include a selectivity estimator 108 that provides estimated selectivities for intermediate database operations that may be included in the execution plan 106. The selectivity estimator 108 may use a model 138 to estimate selectivity of intermediate query expressions that may be included in the execution plan 106. The model 138 may be a regression model that receives a query and returns an estimated selectivity for the query. The model 138 may quickly determine the approximate selectivity. The model 138 may allow the selectivity estimator 108 to quickly provide accurate estimated selectivities. Through use of the model 138, the query optimizer 102 may efficiently formulate an optimal execution plan for performing the query 104.

The model generator 112 may generate the model 138. The model 138 may be a regression model. The model 138 may be trained on a set of training examples. A training example may be a database operation and label for that operation. The label may be a selectivity of the database operation. Generating or obtaining actual labels for training examples may be time intensive. The model generator 112 may reduce the time required to generate a model capable of estimating selectivities as compared to generating a model using actual labels. The model generator 112 may determine a number of training examples necessary for the model 138 to achieve a target accuracy. The model generator 112 may generate approximate labels for the training examples necessary to train the model 138. The model generator 112 may reduce the time required to generate labeled examples by (1) efficiently determining an optimal number of required examples and (2) efficiently generating approximate selectivity labels for those examples. In other words, the model generator 112 may reduce the cost of generating the model 138 by reducing the cost of generating each label and by not generating more labels than necessary.

The model generator 112 may include a training size calculator 114, a label generator 126, and a training module 136.

The training size calculator 114 may determine a number of training examples necessary for the model 138 to achieve a target accuracy. The number of training examples may be a minimum number of training examples necessary for the model 138 to achieve the target accuracy.

The training size calculator 114 may receive inputs 116. The inputs 116 may include a target accuracy 120. The target accuracy 120 may be a measure of the desired accuracy for the model 138. Accuracy of the model 138 may increase as the number of training examples used to train the model 138 increases.

The inputs 116 may include an initial training size 118. The initial training size 118 may be an initial number of examples that the training size calculator 114 uses to train the model 138.

The inputs may include a maximum size 122. The maximum size 122 may be a maximum number of examples that the training size calculator 114 may use for training the model 138.

The inputs 116 may include a cost ratio 124. The cost ratio 124 may be a ratio of labeling cost to cross-validation cost. The cross-validation cost may be an amount of time to run cross-validation on the examples used to train the model 138. The labeling cost may be an amount of time to compute a label for one example.

The training size calculator 114 may use an iterative approach to determine the number of training examples. The training size calculator 114 may cause the training module 136 to train the model 138 on training data 140 having a size 142. The size 142 of the training data 140 may represent a number of training examples contained in the training data 140. The training examples may be labeled. In a first iteration, the size 142 of the training data 140 may be the initial training size 118. The training module 136 may train the model 138 using cross-validation. The training module 136 may use k-fold cross-validation to train the model 138. Performing k-fold cross-validation may include splitting the training data 140 into k subsets of data (which may be referred to as folds). It may also include training the model 138 on all but one (k-1) of the subsets and then evaluating the model 138 on the subset that was not used for training. This process may be repeated k times. Each time a different subset may be reserved for evaluation (and excluded from training). Performing a k-fold cross-validation may generate k models, k sets of data to train the models, k sets of data to evaluate the models, and k evaluations, one for each model. The accuracy of the model 138 may be evaluated based on results of cross-validation.

After causing the training module 136 to run cross-validation on the training data 140, the training size calculator 114 may determine whether the model 138 has an accuracy that satisfies the target accuracy 120. If the model 138 does satisfy the target accuracy 120, the training size calculator 114 may return the model 138. If the model 138 does not satisfy the target accuracy 120, the training size calculator 114 may increase the size 142 of the training data 140, the training module 136 may run cross-validation on the model 138 based on the training data 140 (now with more examples than in the initial iteration), and the training size calculator may determine whether the model 138 has an accuracy that satisfies the target accuracy 120. The training size calculator 114 may repeat this process until the model 138 satisfies the target accuracy 120. In some designs, the training size calculator 114 may stop increasing the size 142 of the training data 140 once the size 142 reaches the maximum size 122. The training size calculator 114 may immediately increase the size 142 to the maximum size 122 if the training size calculator 114 determines that the model 138 cannot achieve the target accuracy 120 even if the training data 140 has the maximum size 122.

One example of how the training size calculator 114 may determine whether the model 138 satisfies the target accuracy 120 is through use of a confidence interval. A confidence interval may be an estimate of a range of values for a parameter that has an unknown value. The confidence interval may represent that, with a defined confidence level, the value of the parameter is actually in the estimated range. The parameter may be the actual error or accuracy of the model 138. The value of that parameter may be unknown. The training size calculator 114 may compute a confidence interval for the accuracy or error of the model 138. The confidence interval may have a lower bound and an upper bound. The training size calculator 114 may determine whether the target accuracy 120 is less than or equal to the lower bound of the confidence interval. If it is, that may mean that, with the defined confidence level, the actual accuracy of the model 138 is equal to or greater than the target accuracy 120. The training size calculator 114 may determine whether the target accuracy 120 is greater than or equal to the upper bound of the confidence interval. If it is, that may mean that, with the defined confidence level, the model 138 cannot achieve the target accuracy 120. If the target accuracy 120 falls between the lower bound and the upper bound, that may mean that the training size calculator should add additional examples to the training data 140 to see if the model 138 can achieve the target accuracy 120 when additional examples are included in the training set.

The target accuracy 120 may be any measure of accuracy or error. One example of the target accuracy 120 may include a target error, a target percentile, and a level of confidence. The target error may be a measure of error for one example. The target error may be a q-error. The q-error may be a measurement of error designed specifically for selectivity estimation. The q-error for an example may be the greater of two ratios. The first ratio may be a ratio of the estimated selectivity for an operation generated by the model 138 and the actual selectivity for the operation. The second ratio may be a ratio of the actual selectivity for the operation and the estimated selectivity for the operation. The target percentile may be a percentage of examples having an error less than the target error. The level of confidence may be a measure of the level of confidence that the actual error of a model is less than a target error.

When the target accuracy 120 includes a target error, a target percentile, and a level of confidence, the training size calculator 114 may use a confidence interval to determine whether the model 138 satisfies the target accuracy 120. The level of confidence may be used as a defined confidence level in computing a confidence interval. The confidence interval may represent that, with the defined confidence level, the actual percentage of example predictions of the model 138 that have an error less than the target error is within a range of values encompassed by a lower bound and an upper bound of the confidence interval. If the target percentile is less than or equal to the lower bound, the training size calculator 114 may determine that, with the level of confidence, the actual percentage of example predictions that have an error less than the target error is greater than or equal to the target percentage. That may mean that the size 142 of the training data 140 is adequate and the training size calculator 114 may return the model 138. If the target percentile is equal to or greater than the upper bound, the training size calculator 114 may determine, with the level of confidence, that the model 138 cannot achieve the target accuracy 120 with the size 142 of the training data 140 capped at the maximum size 122. That may mean that the training size calculator 114 trains the model 138 on the training data 140 with the maximum size 122 and returns the model 138. If the target percentile is in between the lower bound and the upper bound, the training size calculator 114 may increase the size 142 of the training data 140 and run another iteration. Increasing the size 142 of the training data 140 may change the confidence interval. Increasing the size 142 of the training data 140 may increase the lower bound of the confidence interval.

With each iteration, the training size calculator 114 may increase the size 142 of the training data 140 by a c factor 146. The c factor 146 may be a number. The training size calculator 114 may multiply the size 142 by the c factor 146 to determine the size 142 of the training data 140 for the next iteration. The c factor 146 may be an optimized value of a geometric step size based on the cost-ratio 124. A c factor with a small value implies a small number of examples need to be generated in each iteration (which saves the cost of labeling more examples) and thus helps complete model training with less overhead. Labeling cost may change across different query expressions. Cross-validation cost may change with changes in a regression model. Optimizing the geometric step size may reduce the total model construction cost. Optimizing the geometric step size may minimize the total time spent on model construction (labeling and cross-validation) across all iterations.

The label generator 126 may generate labels for training examples. The label generator 126 may generate labels for additional training examples needed to increase the size 142 of the training data 140. The label generator 126 may generate approximate selectivity labels for example queries. The approximate selectivity labels may satisfy a target error.

The label generator 126 may receive inputs 128. The inputs 128 may include a set of queries 130 (which may be a set of example queries for which labels need to be generated in a given iteration of the training size calculator 114), a target error 132, and a table 134. The set of queries 130 may be a set of training queries. The target error 132 may be a defined error that a query in the set of queries 130 must meet. The target error 132 may include an error threshold and a probability threshold. The error threshold may be a q-error threshold. The table 134 may be a uniform random sample of an intermediate query expression. An intermediate expression may be a join between tables contained in the database system 110. The table 134 may contain tuples.

The label generator 126 may use an iterative approach to determine an approximate selectivity for each query in the set of queries 130. The label generator 126 may begin with an initial subset of the tuples contained in the table 134. The initial subset may be less than a total number of tuples in the table 134. The initial subset may be a defined percentage of the total number of tuples in the table 134. The initial subset may be a random subset of the tuples contained in the table 134. The tuples in the table 134 may be in a random order. The label generator 126 may determine an approximate selectivity label for each query in the set of queries 130. Using the approximate selectivity labels, for each query in the set of queries 130, the label generator 126 may determine whether the query satisfies the target error 132. The label generator 126 may remove any queries from the set of queries 130 that satisfy the target error 132. If the set of queries 130 is not empty, the label generator 126 may obtain another random subset of the tuples contained in the table 134 (different from any previous tuples used) and update the approximate selectivity label for each query in the set of queries 130 based on the another random subset of tuples. Using the updated approximate selectivity labels, for each query in the set of queries 130, the label generator 126 may determine whether the query satisfies the target error 132. The label generator 126 may remove any queries from the set of queries 130 that satisfy the target error 132. The label generator 126 may continue this process until the set of queries 130 is empty. At that point, the label generator 126 may return the approximate selectivity labels. The label generator 126 may end the process if the label generator 126 has used a defined maximum number of tuples from the table 134 or used all tuples in the table 134. The label generator 126 may then return the approximate selectivity labels, even if one or more of the approximate selectivity labels do not satisfy the target error 132.

When the target error 132 includes an error threshold and a probability threshold, the label generator 126 may use a confidence probability to determine whether a query satisfies the target error 132. The label generator 126 may compute a confidence probability for each query in the set of queries 130. The confidence probability may represent a likelihood that the difference between a current selectivity estimate for a query and an actual selectivity for the query is less than the error threshold. The difference may be an unknown value. The label generator 126 may remove any queries from the set of queries 130 for which the confidence probability is above the probability threshold. If the set of queries 130 is not empty, the label generator 126 may update the selectivity estimate for each remaining query using additional random tuples from the table 134. With each iteration, the label generator 126 may use an additional number of random tuples equal to a uniform step size. In the alternative, the label generator 126 may use an additional number of random tuples based on a function of the number of tuples the label generator 126 has already obtained. After updating the selectivity estimate for each remaining query, the label generator 126 may compute a confidence probability for each query in the set of queries 130 based on the updated selectivity estimate for that query. The label generator 126 may remove any queries from the set of queries 130 for which the confidence probability is above the probability threshold. The label generator 126 may continue updating the selectivity estimates using additional tuples from the table 134 until the set of queries 130 is empty. The label generator 126 may end the process if the label generator 126 has used a defined maximum number of tuples from the table 134 or used all tuples in the table 134.

Figure 2:
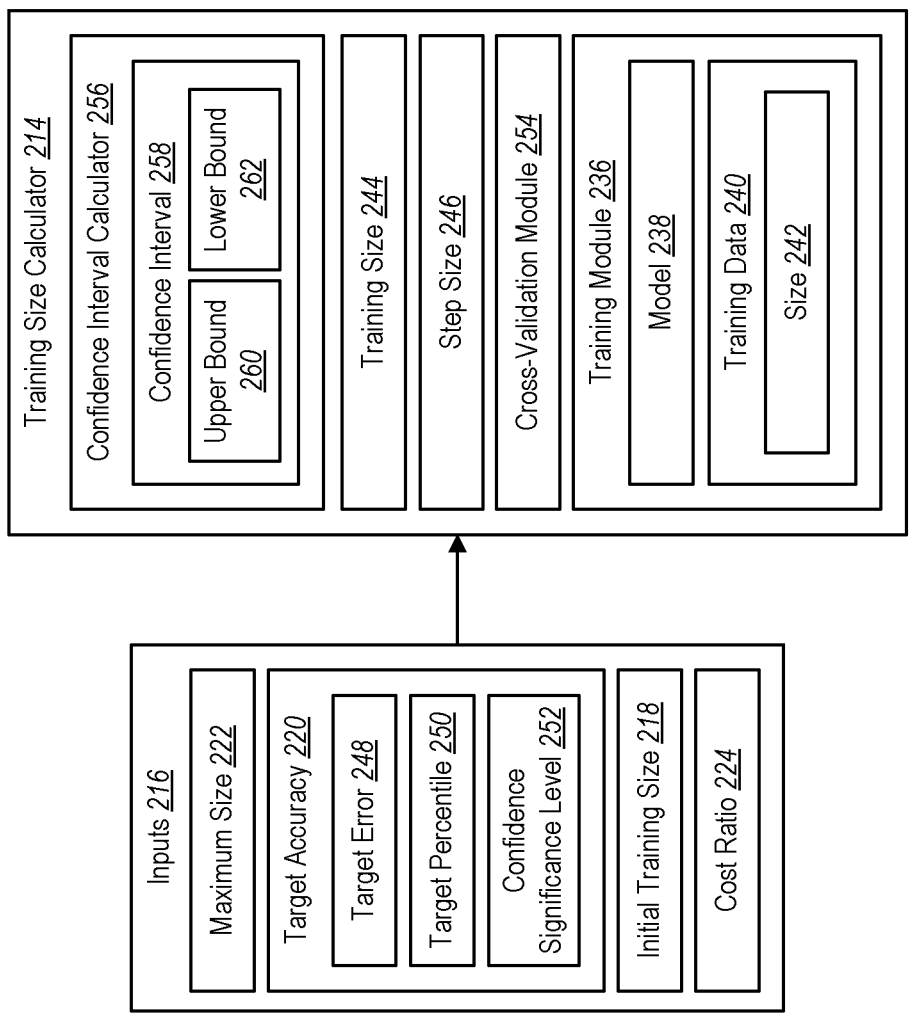
FIG. 2 illustrates an example training size calculator for determining a size of training data necessary for a model to achieve a target accuracy.

FIG. 2 illustrates an example training size calculator 214. The training size calculator 214 may determine a number of training examples (which may be training size 244) required for a model 238 to achieve a target accuracy 220. The model 238 may be a regression model for estimating a selectivity for a database operation. The training size 244 required for the model to achieve the target accuracy may vary across different query expressions. The training size calculator 214 may return the model 238. The training size calculator 214 may return the training size 244.

The training size calculator 214 may use an iterative approach to determine the training size 244 and train the model 238. The training size calculator 214 may iteratively increase a size 242 of training data 240 until the model 238 achieves the target accuracy 220

The training size calculator 214 may receive inputs 216. The inputs 216 may include the target accuracy 220, an initial training size 218 (which may be represented as so), a maximum size 222 (which may be represented as m), and a cost ratio 224 (which may be represented as r).

The target accuracy 220 may be a desired accuracy the model 238 should achieve. A user or client may specify the target accuracy 220. The target accuracy 220 may include one or more accuracy parameters. For example, the target accuracy 220 may include a target error 248 (which may be represented as E), a target percentile 250 (which may be represented as p), and a confidence significance level 252 (which may be represented as δ). The target error 248 may be a desired error the model 238 should achieve for a given percentage of examples. The given percentage of examples may be the target percentile 250. The error for a single example may be a measure of error between an estimated label for an example returned by the model 238 and an actual label for the example.

One way to measure error for an example may be a q-error. The q-error may be designed for use in selectivity estimation. Computing a q-error for an example query may include computing a first ratio of estimated selectivity for the example query to actual selectivity for the example query. Computing the q-error for the example query may include computing a second ratio of the actual selectivity to the estimated selectivity. Computing the q-error for the example query may include determining a maximum value as between the first ratio and the second ratio. The q-error for the example query may be the maximum value. For example, assume that a query example has an actual selectivity of 5,000 rows out of 10,000 rows. Assume that a model returns an estimated selectivity of 2,500 rows for the query example. A first ratio of the estimated selectivity to the actual selectivity may be ½. A second ratio of the actual selectivity to the estimated selectivity may be 2. A maximum value as between the first ratio and the second ratio may be 2. As a result, the q-error for the query example may be 2.

The target percentile 250 may be a percentage of examples for which estimates of the model 238 have an error less than or equal to the target error 248. If the target percentile 250 is 95 percent, then 95 percent of estimates of the model 238 must satisfy the target error 248 for the model 238 to satisfy the target accuracy 220. For example, assume 100 examples, a target percentile of 95, and a q-error of 2. If 96 estimates of the model 238 have a q-error of less than or equal to 2, then the percentage of the estimates of the model 238 that are less than target error 248 exceeds the target percentile of 95, and the model 238 may satisfy the target accuracy 220. If only 94 estimates of the model 238 have a q-error of less than or equal to 2, then the percentage of the estimates of the model 238 that satisfy the target error 248 does not exceed the target percentile 250 of 95, and the model 238 may not satisfy the target accuracy 220.

The confidence significance level 252 may be a measure of confidence in a result. The confidence significance level 252 may be a measure of confidence that actual error of a model is within a defined confidence interval. The confidence significance level 252 may be a number between 0 and 1. A confidence significance level of less than 0.5 may mean confidence is less than average. A confidence significance level of more than 0.5 may mean that confidence is more than average. The closer the confidence significance level 252 is to 1, the greater the confidence may be.

The training size calculator 214 may include a confidence interval calculator 256. The confidence interval calculator 256 may compute a confidence interval 258 (which may be represented as $[(\overline{p}), (\underline{p})]$). The confidence interval 258 may be an estimate of a range of values for an unknown parameter along with a confidence level that the unknown parameter is in that range. For example, the unknown parameter may be an accuracy metric. The accuracy metric may be a testing error for a model when the model is applied to test data. The confidence interval 258 may be an attempt to estimate unknown error when the model 238 is applied to the training data 240.

The initial training size 218 (so) may be a number of training examples. The training examples may be labeled training examples. The initial training size 218 may be a number of training examples the training size calculator 214 uses to train the model 238 on a first iteration of determining the training size 244. For example, the initial training size 218 may be 100, and the training size calculator 214 may use 100 labeled examples to train the model 238 on the first iteration of determining the training size 244.

The maximum size 222 (m) may be a maximum number of training examples. The maximum size 222 may operate as a termination criterion for the training size calculator 214. For example, the training size calculator 214 may stop calculating the training size 244 if the model 238 cannot achieve the target accuracy 220 even when the model 238 is trained using the maximum size 222 of training examples. Failing to achieve the target accuracy 220 using the maximum size 222 number of training examples may indicate that something in the model 238 needs to be changed.

The cost ratio 224 (r) may be a ratio between labeling costs and cross-validation cost. The labeling costs may be a time required to compute a label for one example. The cross-validation cost may be a time required to run a cross-validation for one example. The cost ratio 224 may inform how frequently the training size calculator 214 performs cross-validation. If cross-validation is costly, the training size calculator 214 may significantly increase the size 242 of the training data 240 before performing cross-validation again. The cost ratio 224 may be known to the training size calculator 214 before the training size calculator 214 begins a process of determining the training size 244.

Cross-validation may be a procedure for estimating an accuracy of a machine learning model. Cross-validation may be a standard procedure. Cross-validation may take training data (such as the training data 240) and output an accuracy metric. Cross-validation may measure how accurate a model is for a specific size of training data (such as the size 242).

The training size calculator 214 may compute a step size 246 (which may be referred to as c and may be equivalent to the c factor 146 shown in FIG. 1). The step size 246 may be a factor by which the training size calculator 214 increases the size 242 of the training data 240 with each iteration. For example, if step size is 2, the training size calculator 214 may double the size 242 of the training data 240 (i.e., double a number of examples in the training data 240) after each iteration. The step size 246 may be based on the cost ratio 224.

The training size calculator 214 may begin with the size 242 of the training data 240 equal to the initial training size 218 (so) (i.e., the training data 240 may begin with a number of training examples equal to the initial training size 218). The training data 240 may be referred to as D. The training size calculator 214 may run cross-validation using D. A cross-validation module 254 may perform cross-validation on the training data 240. Cross-validation may output estimates for training and testing examples in each fold.

The confidence interval calculator 256 may compute the confidence interval 258 for a percentage of estimates below the target error 248 ($\epsilon$). The confidence interval 258 may have an upper bound 260 ($\bar{p}$) and a lower bound 262 ($\underline{p}$). The training size calculator 214 may compute an average percentage of estimates for training and testing examples with q-error below $\epsilon$ in each fold respectively, denoted as $p_1$ and $p_2$. The training size calculator 214 may compute the upper bound 260 (assuming 10-fold cross-validation is used) as follows:

$$\bar{p} = p_1 + \sqrt{\frac{8}{9s}\ln\frac{2}{\delta}}$$

The training size calculator 214 may compute the lower bound 262 as follows:

$$\underline{p} = p_2 + \sqrt{\frac{1}{2s}\ln\frac{1}{\delta}}$$

The training size calculator 214 may determine that when the target percentile 250 (p) is equal to or below the lower bound 262 ($\underline{p}$), then the target percentile 250 has been met with probability at least $1-\delta$. At that point, the training size calculator 214 may stop adding more training examples to the training data 240. A training module 236 may train the model 238 on the training data 240, and the training size calculator 214 may return the model 238. The training size calculator 214 may determine that when the target percentile 250 (p) is equal to or greater than the upper bound 260 ($\bar{p}$), the model 238 cannot achieve the target percentile 250 with the maximum size 222 (m) with probability at least $1-\delta$. In that situation, the training size calculator 214 may add sufficient examples to the training data 240 such that the size 242 of the training data 240 equals the maximum size 222. The training module 236 may use the training data 240 having the maximum size 222 to train the model 238, and the training size calculator 214 may return a best model for that budget. When the target percentile 250 is contained in the confidence interval 256, the training size calculator 214 may increase the size 242 of the training data 240 geometrically based on the step size 246.

The cost of labeling may dominate the cost of cross-validation for a given number of examples. The algorithm used by the training size calculator 214 may have a constant-ratio approximation guarantee of optimality. The choice of the step size 246 (c) may be optimal in terms of the approximation ratio. In other words, the step size 246 may minimize the total time spent on model construction (labeling and cross-validation) across all iterations.

Theorem 1. Assuming specific random order of training examples, the training size calculator 214 has a $$\left(\sqrt{\frac{1}{r+1}}+1\right)^2$$

–approx guarantee, i.e., the total cost is no larger than $$\left(\sqrt{\frac{1}{r+1}}+1\right)^2$$

times the cost of directly generating and cross-validating with s* examples, where s* is the optimal number of training examples such that $s^* > s_0$.

Proof. Let the cost of generating s training examples and cross-validation using s examples be $C_1(s)$ and $C_2(s)$ respectively. For the training size calculator 214, $C_1(s) = C_2(rs) \gg C_2(s)$, and both are proportional to s. The cost of generating and cross-validating with the optimal number of s* training examples is $C_{opt} = C_1(s^*) + C_2(s^*) = (r+1)C_2(s^*)$.

The training size used in the training size calculator 214 is $s_0, cs_0, \ldots$. Let k be the smallest integer such that $c_k s_0 \geq s^*$. By definition, $c_k-1 s_0 < s^*$. The cost of the training size calculator 214 is given by $$C = C_1(c_k s_0) + \sum_{i=0}^{k} C_2(c^i s_0)$$

$$= C_1(c \times c_k - 1 s_0) + C_2\left(\frac{c^{k+1}-1}{c-1}s_0\right) <$$

-continued $$C_1(cs^*) + C_2\left(\frac{c^2}{c-1}s^*\right) = C_2(s^*)\left(rc + \frac{c^2}{c-1}\right)$$

$$= \frac{rc + \frac{c^2}{c-1}}{r+1}C_{opt}$$

This means that for any geometric base c>1, the training size calculator 214 has a $$\frac{rc + \frac{c^2}{c-1}}{r+1}$$

–approx guarantee. This number reaches its minimum $$\left(\sqrt{\frac{1}{r+1}} + 1\right)^2$$

when $$c = 1 + \sqrt{\frac{1}{r+1}}.$$

When r>5, the approximation ratio is smaller than 2. When r>10, the approximation ratio is smaller than 1.7. When r>100, the approximation ratio is smaller than 1.2.

Intuitively, the theorem implies that the iterative procedure can get closer to the optimal cost of model construction by reducing the geometric step size, compared to a doubling approach, when label generation is costlier than cross validation.

One algorithm (which may be referred to as Algorithm 1) the training size calculator 214 may use to determine the number of training examples is as follows:

Inputs: maximum # training examples m, target q-error $\epsilon$>1, target percentile p, significance level of confidence $\delta$<1, initial training size $s_0$, ratio r of labeling cost vs. cross validation cost per example Initialization: Label s=s0 random examples as the initial pool D. Set $$c = 1 + \sqrt{\frac{1}{r+1}}.$$

while s≤m do
Run cross validation using D
Compute the confidence interval [p̄,p̲] of the percentile of predictions with q-error below $\epsilon$

```
if p̲ ≥ p then break
    s_0 ← s
if p̄ ≤ p then
    s ← m
else
    s ← c × s
``` label s–$s_0$ random examples and add them to D return model trained with D

Figure 3:
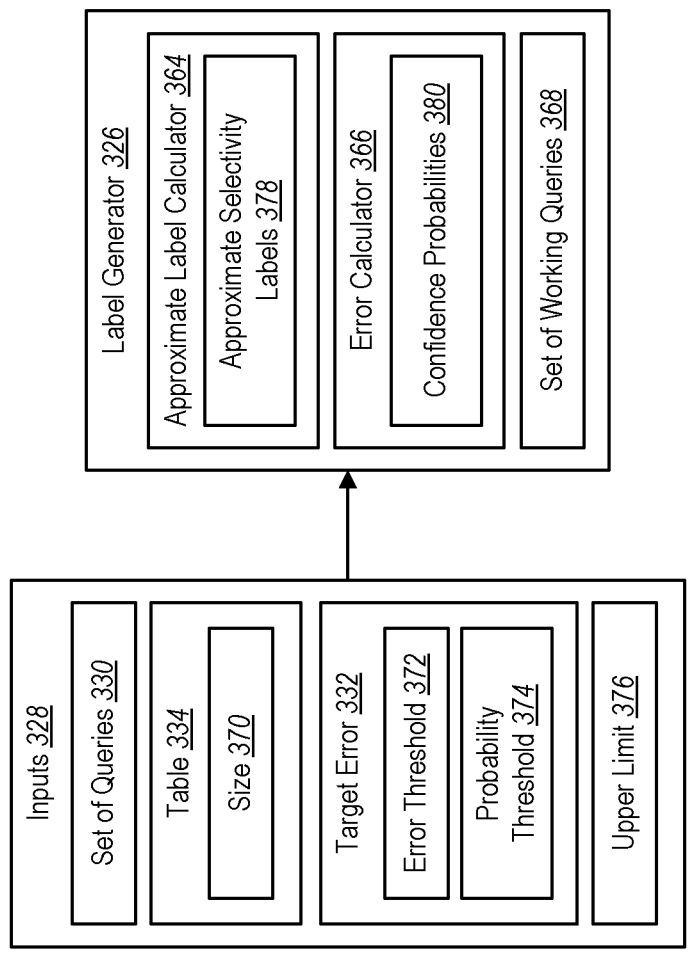
FIG. 3 illustrates an example label generator for generating approximate labels for training examples for a model.

FIG. 3 illustrates an example label generator 326. The label generator 326 may approximate selectivity labels for a set of unlabeled training examples. The label generator 326 may generate approximate selectivity labels for a model generator (such as the model generator 112) or a training size calculator (such as the training size calculator 114 or the training size calculator 214). The label generator 326 may operate independently of the model generator and the training size calculator.

The label generator 326 may receive inputs 328. The inputs 328 may include a set of queries 330 (which may be referred to as $Q_{i,t}=\{q_1, \ldots, q_n\}$), a table 334 (which may be referred to as T), a target error 332, and an upper limit 376. The target error 332 may include an error threshold 372 (which may be referred to as η), and a probability threshold 374 (which may be referred to as a).

The set of queries 330 may be a set of training queries. The set of queries 330 may be unlabeled.

The table 334 may be a result of an intermediate query expression that includes tuples. The table 334 may have a size 370 (which may be referred to as N) that represents a number of tuples in the table 334.

The label generator 326 may produce approximate selectivity labels that have some amount of error for each label. The label generator 326 may generate labels such that the approximation error for the labels is below a threshold. The threshold may be the error threshold 372. The error threshold 372 may be a q-error threshold.

The probability threshold 374 may represent a threshold probability that all queries satisfy a criterion, such as the error threshold 372.

Generating a selectivity label for a single query may be expensive (in terms of time or computing power) for large datasets. The label generator 326 may reduce the cost of computing selectivity labels based on the assumption that small errors in model predictions (e.g., q-error<2) can be tolerated. The label generator 326 may generate approximate selectivity labels for training queries using a sample of data rather than all the data. In general, the larger the selectivity of a query, the smaller a size of data sample required to produce its approximate label for a given relative error bound. The label generator 326 may target to a bound q-error instead of an absolute q-error. The label generator 326 may minimize a total cost of label generation for multiple queries in each training iteration.

Consider a set of working queries 368 ($Q_{i,t}=\{q_1, \ldots, q_n\}$) to be a set of training queries (in a given iteration), and act($q_i$) be a true selectivity of $q_i$. The set of working queries 368 may be identical to the set of queries 330 in a first iteration. Using t random tuples from the table 334, an approximate label calculator 364 may determine approximate selectivity labels 378 for the set of working queries 368. The approximate selectivity labels 378 may include an approximate selectivity label $l_i(t)$ for each query $q_i$, i.e., $l_i(t) \approx$ act($q_i$) where N is the total number of tuples in the table 334. The label generator 326 may use concentration inequalities to bound the difference between $l_i(t)$ and act($q_i$) with high probability. A difference between $l_i(t)$ and act($q_i$) may decrease as t increases. The label generator 326 may progressively increase the data sample size t used for the approximate selectivity labels 378. This procedure may require that the label generator 326 process tuples from the table 334 in random order and scan each of the N tuples at most once. To control the labeling cost for large datasets the label generator 326 may use the upper limit 376 (Upper_Limit) as a ceiling on the number of tuples to be processed. When the difference for a query $q_i$ is below a desired threshold with high probability, the label generator may prune query $q_i$ from the set of working queries 368 and stop updating its associated approximate selectivity label (contained in the approximate selectivity labels 378). For example, an error calculator 366 may determine confidence probabilities 380 for each query in the set of working queries 368. The confidence probabilities 380 may be based on the current approximate selectivity labels 378. If a confidence probability for a given query is greater than the probability threshold 374, then the label generator 326 may remove that query from the set of working queries 368. When the set of working queries 368 is empty, the label generator 326 may return the approximate selectivity labels 378 for the set of queries 330.

The label generator 326 may use the following algorithm (which may be referred to as Algorithm 2) to determine the approximate selectivity labels 378:

Inputs: $Q_{i,t}=\{q_1, \ldots, q_n\}$, $T=\{t_1 \ldots , t_N\}$, q-error threshold $\eta>1$, probability threshold $\alpha<1$ Initialization: j=0, k=100, tuples in T are assumed to be in random order while y≤min(Upper_Limit, N) and $Q_{i,t} \neq \emptyset$ do Evaluate tuple $t_{j+1}$ to $t_k$ for each query $q_i$ in $Q_{i,t}$ and update their approximate labels Update confidence probability for each query $q_i$ in $Q_{i,t}$ to achieve q-error bound $\eta$ Remove queries from $Q_{i,t}$ for which the confidence probability is above $\alpha$ j←k k←2×k Given query $q_i$ and sample size t, the error calculator 366 may calculate a confidence probability for $l_i(t)$ $$\in \left[\frac{\text{act}(q_i)}{\eta}, \eta \times \text{act}(q_i)\right].$$

To simplify notations l and a may be used to abbreviate for $l_i(t)$ and $\text{act}(q_i)$ respectively.

First, based on the multiplicative Chernoff bound, the following may hold:

$$Pr\left[\frac{l}{N} < \frac{a}{\eta N}\right] < \left(\eta^{1/\eta} e^{1/\eta - 1}\right)^{ta/N} = (\eta e^{1-\eta})^{\frac{ta}{\eta N}} \leq (\eta e^{1-\eta})^{\frac{tl}{N}}$$

The last inequality is because $\eta>1$, $\eta e^{1-\eta}<1$.

Second, based on Hoeffding's inequality, the following may hold:

$$Pr\left[\frac{l}{N} - \frac{a}{N} > \frac{l}{N} - \frac{l}{N\eta}\right] \leq e^{-2t^2 l^2 \left(1-\frac{1}{\eta}\right)^2 / N^2}$$

Together with probability at least $$1 - (\eta e^{1-\eta})^{tl/N} - e^{-2t^2 l^2 \left(1-\frac{1}{\eta}\right)^2 / N^2},$$

the ratio between approximate label l and the true selectivity a may be bounded by $[1/\eta, \eta]$.

The total number of samples used by the label generator 326 may have a constant ratio approximation guarantee of optimality.

Proposition 1. The label generator 326 may have a 2-approx guarantee, i.e., the total labeling cost is no larger than twice the cost of using the minimal number of samples for each query.

Observe that, even though the label generator 326 may use a sample size that follows a geometric schedule, a linear schedule would have been a better choice when N is very large and most of the queries happen to have large values of actual selectivities, which implies that small data samples would be sufficient.

Algorithm 1 may ensure that the target accuracy 220 is achieved if (a) the maximum size 222 (m) is sufficiently large, (b) the model 238 being used has sufficient representative power, and (c) true selectivity labels are used for training. But due to practical constraints on training time or memory footprint, it may not be possible to satisfy one or more of these requirements. In such cases, the training procedure can be restarted with larger values of m or model size while reusing the labeled examples already generated in the first attempt. Further, if a small value of Upper_Limit on sample size is chosen, it can lead to errors in selectivity labels. In that case, the learned model is approximating the selectivity function for a random data-sample with Upper_Limit rows.

Algorithm 1 may use any regression technique for model construction. Use of such alternatives would only cause change in value of parameter r (ratio of labeling cost to cross validation cost), resulting in different optimal value of geometric step size c. The label generator 326 may be independent of the method used to compute selectivity labels (line 3 in Algorithm 2). The label generator 326 may use regular query execution to get these labels, but it can easily be replaced by a more efficient alternative—for instance, an unsupervised model.

Figure 4:
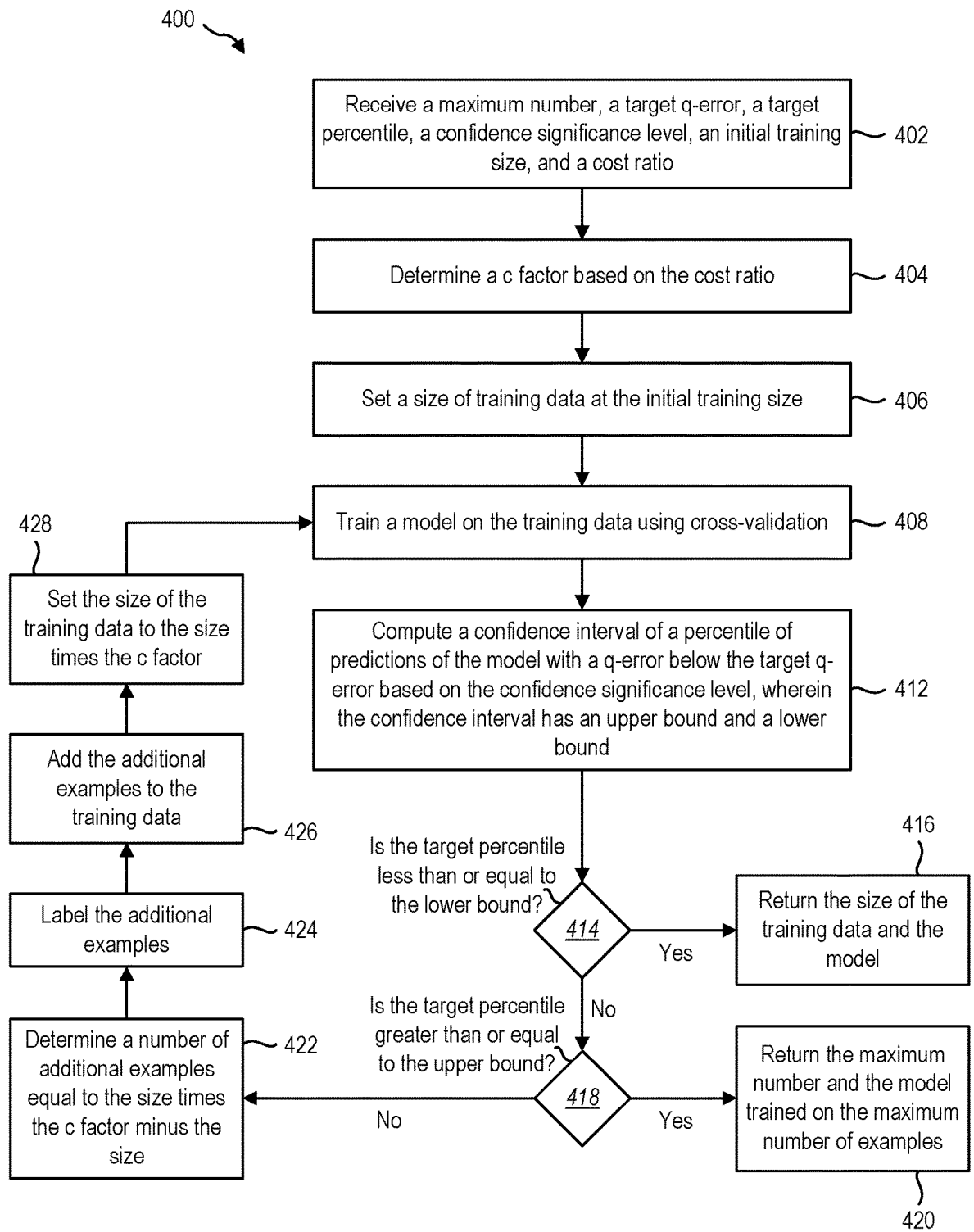
FIG. 4 illustrates an example method for determining a size of training data necessary for a model to achieve a target accuracy.

FIG. 4 illustrates an example method 400 for determining a number of training examples for a model to achieve a target accuracy. The training size calculator 114 or the training size calculator 214 may perform one or more steps of the method 400.

The method 400 may include receiving 402 a target q-error, a target percentile, a confidence significance level, an initial training size, and a cost ratio. The method 400 may involve receiving fewer or different inputs. The method 400 may involve receiving additional inputs. For example, the method 400 may include receiving a c factor.

The method 400 may include determining 404 a c factor based on the cost ratio.

The method 400 may include setting 406 a size of training data at the initial training size. Setting 406 the size of the training data at the initial training size may include receiving or obtaining a number of labeled training examples equal to the initial training size. Setting 406 the size of the training data at the initial training size may include generating a number of labeled training examples equal to the initial training size. Setting 406 the size of the training data at the initial training size may include a combination of receiving or obtaining labeled training examples and generating labeled training examples.

The method 400 may include training 408 a model on the training data using cross-validation. The cross-validation may be k-fold cross-validation. The model may be a regression model. The model may estimate a selectivity for a database query or operation.

The method 400 may include computing 412 a confidence interval of a percentile of predictions of the model with a q-error below the target q-error, wherein the confidence interval has an upper bound and a lower bound. Computing 412 the confidence interval may include computing the confidence interval with the confidence significance level. It may be that, with the confidence significance level, the actual percentile of predictions of the model with a q-error below the target q-error is between the upper bound and the lower bound.

The method 400 may include determining 414 whether the target percentile is less than or equal to the lower bound.

If the target percentile is less than or equal to the lower bound, the method 400 may include returning 416 the size of the training data and the model. Returning 416 the model may include training the model on the training data.

If the target percentile is not less than or equal to the lower bound, the method 400 include determining 418 whether the target percentile is greater than or equal to the upper bound.

If the target percentile is greater than or equal to the upper bound, the method 400 may include returning 420 the maximum number and the model trained on the maximum number of examples.

If the target percentile is not greater than or equal to the upper bound, the method 400 may include determining 422 a number of additional examples equal to the size of the training data times the c factor minus the size. The number of additional examples may be a number of examples needed to increase the size of the training data to an amount of the c factor times the size.

The method may include labeling 424 the additional examples. Labeling 424 the additional examples may include receiving true labels for the additional examples. Labeling 424 the additional examples may include generating approximate labels for the additional examples. Generating the approximate labels for the additional examples may include performing one or more of the steps shown in FIG. 5. The label generator 126 or the label generator 326 may generate the approximate labels.

The method may include adding 426 the additional examples to the training data.

The method may include setting 428 the size of the training data to the size times the c factor and returning to training 408 the model on the training data using cross-validation.

Figure 5:
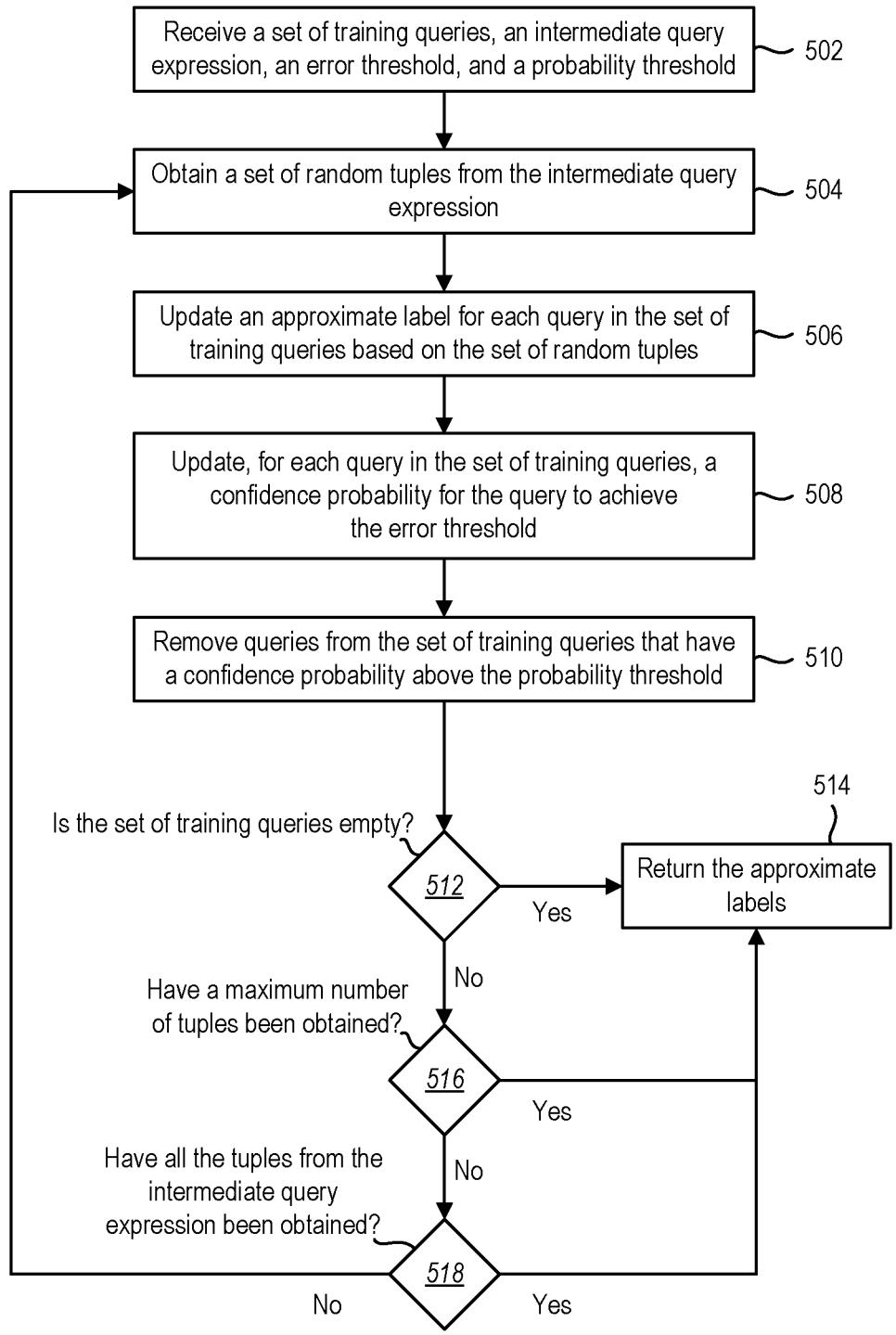
FIG. 5 illustrates an example method for generating approximate labels for training examples for a model.

FIG. 5 illustrates an example method 500 for generating labels for a set of training examples. The label generator 126 or the label generator 326 may perform one or more of the steps of the method 500.

The method 500 may include receiving 502 a set of training queries, an intermediate query expression, an error threshold, and a probability threshold.

The method 500 may include obtaining 504 a set of random tuples from the intermediate query expression. The set of random tuples from the intermediate query expression may have a size t. The size t may be uniform for each iteration. The tuples from the intermediate query expression may be in a random order. The set of random tuples from the intermediate query expression may be different from any previous set of random tuples obtained during the method 500.

The method 500 may include updating 506 an approximate label for each query in the set of training queries based on the set of random tuples. Updating 506 the approximate label for each query in the set of training queries may include updating the approximate labels for only those queries that have not yet been removed from the set of training queries. Updating 506 the approximate label for each query may include determining the approximate label for each query on a first iteration. Updating 506 the approximate label for each query based on the set of random tuples may include updating the approximate label for each query that was computed on a previous iteration. With each iteration, the approximate label for each query in the set of training queries may be based on an increasing number of tuples from the intermediate query expression. For example, if each set of random tuples obtained from the intermediate query expression includes 10 tuples, updating 506 the approximate label for each query in the set of training queries on a first iteration may include determining the approximate label for each query based on 10 tuples from the intermediate query expression. Updating 506 the approximate label for each query in the set of training queries on a tenth iteration may include determining the approximate label for each query based on 100 tuples from the intermediate query expression. On the tenth iteration, updating 506 the approximate label for each query in the set of training queries may include updating the approximate label based on the 10 additional tuples obtained in the tenth iteration.

The method 500 may include updating 508, for each query in the set of training queries, a confidence probability for the query to achieve the error threshold. Updating 508, for each query in the set of training queries, the confidence probability for the query to achieve the error threshold may include, on a first iteration, determining the confidence probability for the query to achieve the error threshold.

The method 500 may include removing 510 queries from the set of training queries that have a confidence probability above the probability threshold.

The method 500 may include determining 512 whether the set of training queries is empty.

If the set of training queries is empty, the method 500 may include returning 514 the approximate labels. Returning 514 the approximate labels may include returning approximate labels for all queries contained in the set of training queries received in step 502.

The method 500 may include determining 516 whether a maximum number of tuples have been obtained. The maximum number of tuples may be a defined number. The maximum number of tuples may be received in step 502.

If the maximum number of tuples have been obtained, the method 500 may include returning 514 the approximate labels. Returning 514 the approximate labels may include returning approximate labels for all queries contained in the set of training queries received in step 502.

The method 500 may include determining 518 whether all the tuples from the intermediate query expression have been obtained.

If all the tuples from the intermediate query expression have been obtained, the method 500 may include returning 514 the approximate labels. Returning 514 the approximate labels may include returning approximate labels for all queries contained in the set of training queries received in step 502.

If not all the tuples from the intermediate query expression have been obtained, the method 500 may include obtaining 504 a set of random tuples from the intermediate query expression. The set of random tuples obtained in each iteration may be distinct from all tuples obtained in previous iterations.

Figure 6:
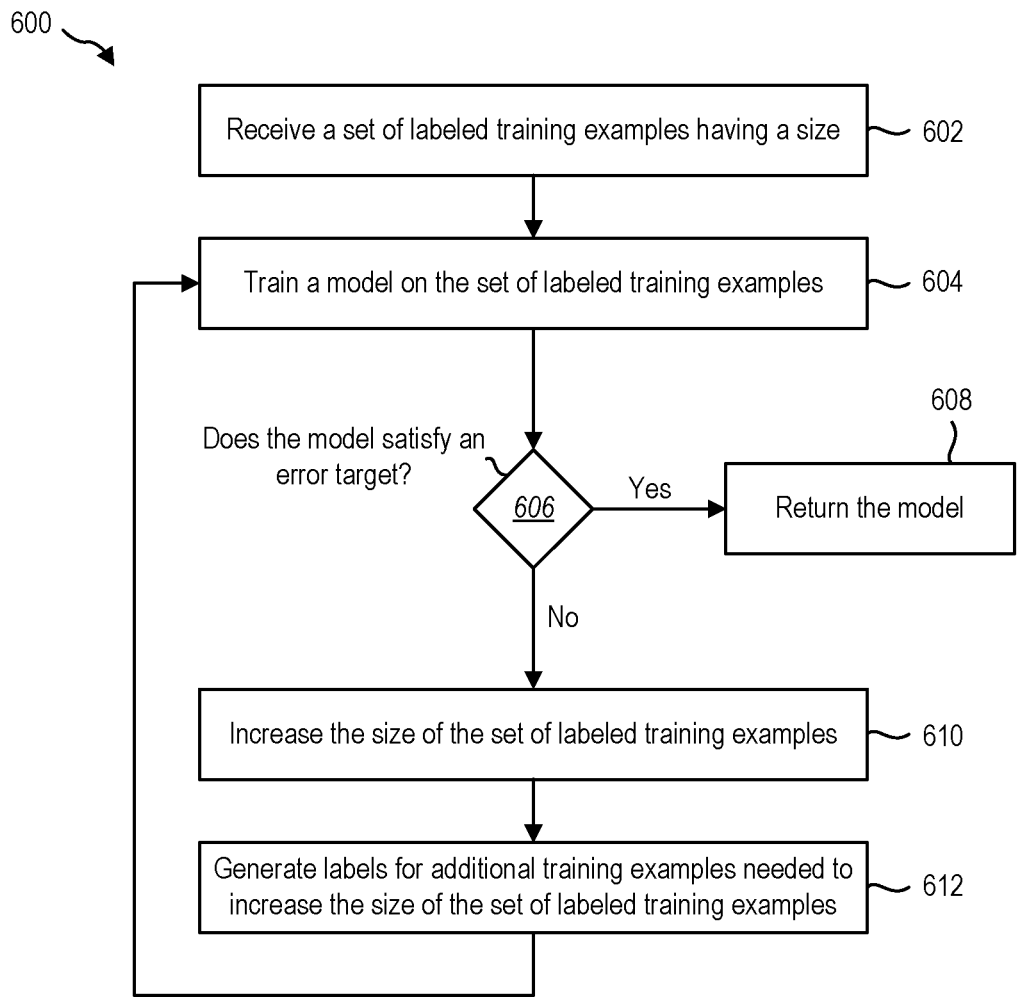
FIG. 6 illustrates an example method for constructing a model that satisfies a target accuracy.

FIG. 6 illustrates an example method 600 for constructing a model that achieves an error target. One or more of the steps of the method 600 may be performed by the model generator 112, the training size calculator 214, or the label generator 326.

The method 600 may include receiving 602 a set of labeled training examples having a size. The size of the set of labeled training examples may be a number of labeled training examples included in the set of labeled training examples.

The method 600 may include training 604 a model on the set of labeled training examples. Training 604 the model on the set of labeled training examples may include running cross-validation on the set of labeled training examples. The cross-validation may be k-fold cross-validation. The model may be a regression model for estimating selectivities.

The method 600 may include determining 606 whether the model satisfies an error target. Determining 606 whether the model satisfies the error target may include computing, based on a confidence significance level, a confidence interval of a percentile of predictions of the model with a q-error below a target q-error. Determining 606 whether the model satisfies the error target may include determining whether a target percentile is less than or equal to a lower bound of the confidence interval.

If the model satisfies the error target, the method 600 may include returning 608 the model. Returning 608 the model may include training the model on the set of labeled training examples.

If the model does not satisfy the error target, the method 600 may include increasing 610 the size of the set of labeled training examples.

The method 600 may include generating 612 labels for additional training examples needed to increase the size of the set of labeled training examples and training 604 the model on the set of labeled training examples. Generating 612 labels for the additional training examples may include performing one or more of the steps shown in FIG. 5.

Figure 7:
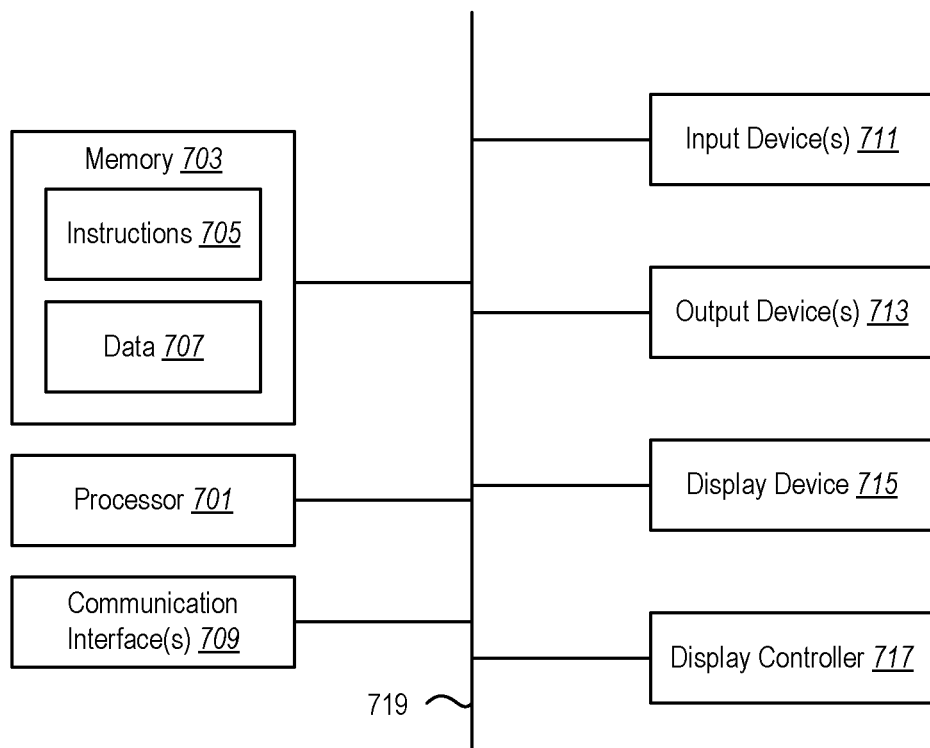
FIG. 7 illustrates certain components that can be included within a computing device.

Reference is now made to FIG. 7. One or more computing devices 700 can be used to implement at least some aspects of the techniques disclosed herein. FIG. 7 illustrates certain components that can be included within a computing device 700.

The computing device 700 includes a processor 701 and memory 703 in electronic communication with the processor 701. Instructions 705 and data 707 can be stored in the memory 703. The instructions 705 can be executable by the processor 701 to implement some or all of the methods, steps, operations, actions, or other functionality that is disclosed herein. Executing the instructions 705 can involve the use of the data 707 that is stored in the memory 703. Unless otherwise specified, any of the various examples of modules and components described herein can be implemented, partially or wholly, as instructions 705 stored in memory 703 and executed by the processor 701. Any of the various examples of data described herein can be among the data 707 that is stored in memory 703 and used during execution of the instructions 705 by the processor 701.

Although just a single processor 701 is shown in the computing device 700 of FIG. 7, in an alternative configuration, a combination of processors (e.g., an ARM and DSP) could be used.

The computing device 700 can also include one or more communication interfaces 709 for communicating with other electronic devices. The communication interface(s) 709 can be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 700 can also include one or more input devices 711 and one or more output devices 713. Some examples of input devices 711 include a keyboard, mouse, microphone, remote control device, button, joystick, trackball, touchpad, and lightpen. One specific type of output device 713 that is typically included in a computing device 700 is a display device 715. Display devices 715 used with embodiments disclosed herein can utilize any suitable image projection technology, such as liquid crystal display (LCD), light-emitting diode (LED), gas plasma, electroluminescence, wearable display, or the like. A display controller 717 can also be provided, for converting data 707 stored in the memory 703 into text, graphics, and/or moving images (as appropriate) shown on the display device 715. The computing device 700 can also include other types of output devices 713, such as a speaker, a printer, etc.

The various components of the computing device 700 can be coupled together by one or more buses, which can include a power bus, a control signal bus, a status signal bus, a data bus, etc. For the sake of clarity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system comprising:
one or more processors;
memory in electronic communication with the one or more processors; and
instructions stored in the memory, the instructions being executable by the one or more processors to:
train a model on a set of labeled training examples using cross-validation, the set of labeled training examples having a size;
determine that the model does not satisfy an accuracy target;
determine a geometric step size for increasing the size of the set of labeled training examples;
increase the size of the set of labeled training examples to a new size based on the geometric step size;
generate labels for the additional training examples needed to increase the size of the set of labeled training examples to the new size;
add the additional training examples and the generated labels to the set of labeled training examples; and
train the model on the set of labeled training examples using cross-validation.

2. The system of claim 1, wherein the instructions are further executable by the one or more processors to determine the geometric step size by:
determining a labeling cost, wherein the labeling cost is a time required to compute a label for one example;
determining a cross-validation cost, wherein the cross-validation cost is a time required to run a cross-validation for one example;
computing a ratio of the labeling cost to the cross-validation cost; and
determining the geometric step size based on the ratio.

3. The system of claim 1, wherein determining that the model does not satisfy the accuracy target comprises:

computing a confidence interval for the model, wherein the confidence interval has a lower bound and an upper bound and represents that, with a confidence significance level, a percentile of predictions of the model that have a q-error less than a target q-error is between the lower bound and the upper bound; and
determining that a target percentile is between the lower bound and the upper bound.

4. The system of claim 3, wherein generating the labels for the additional training examples comprises:
obtaining a set of random tuples from an intermediate query expression, wherein the set of random tuples is less than a total number of tuples from the intermediate query expression;
determining approximate labels for the additional training examples based on the set of random tuples;
determining confidence probabilities for the additional training examples to achieve an error threshold;
identifying one or more examples of the additional training examples that have a confidence probability above a probability threshold;
obtaining a second set of random tuples from the intermediate query expression, wherein the second set of random tuples does not overlap with the set of random tuples; and
updating the approximate labels for the one or more examples of the additional training examples.

5. The system of claim 4, wherein the approximate labels are approximate selectivity labels.

6. The system of claim 1, wherein determining that the model does not satisfy the accuracy target comprises:
determining that a target percentile is less than or equal to a lower bound of a confidence interval.

7. The system of claim 6, wherein the confidence interval is a percentile of predictions of the model that have a q-error less than a target q-error.

8. The system of claim 1, wherein the geometric step size minimizes a total time spent on model construction.

9. The system of claim 1, wherein the instructions being further executable by the one or more processors to:
iteratively increase the size of the set of labeled training examples, wherein the size of the set of labeled training examples is less than or equal to a maximum size of labeled training examples.

10. The system of claim 1, wherein generating the labels for the additional training examples comprises:
obtaining a set of random tuples from an intermediate query expression, wherein the set of random tuples is less than a total number of tuples from the intermediate query expression;
determining approximate labels for the additional training examples based on the set of random tuples; and
updating the approximate labels for the one or more examples of the additional training examples.

11. A method, comprising:
training a model on a set of labeled training examples using cross-validation, the set of labeled training examples having a size;
determining that the model does not satisfy an accuracy target;
determining a geometric step size for increasing the size of the set of labeled training examples;
increasing the size of the set of labeled training examples to a new size based on the geometric step;
generating labels for additional training examples needed to increase the size of the set of labeled training examples to the new size;

adding the additional training examples and the generated labels to the set of labeled training examples; and training the model on the set of labeled training examples using cross-validation.

12. The method of claim 11, wherein determining the geometric step size further comprises:

determining a labeling cost, wherein the labeling cost is a time required to compute a label for one example;

determining a cross-validation cost, wherein the cross-validation cost is a time required to run a cross-validation for one example;

computing a ratio of the labeling cost to the cross-validation cost; and determining the geometric step size based on the ratio.

13. The method of claim 11, wherein determining that the model does not satisfy the accuracy target comprises:

computing a confidence interval for the model, wherein the confidence interval has a lower bound and an upper bound and represents that, with a confidence significance level, a percentile of predictions of the model that have a q-error less than a target q-error is between the lower bound and the upper bound; and determining that a target percentile is between the lower bound and the upper bound.

14. The method of claim 13, wherein generating the labels for the additional training examples comprises:

obtaining a set of random tuples from an intermediate query expression, wherein the set of random tuples is less than a total number of tuples from the intermediate query expression;

determining approximate labels for the additional training examples based on the set of random tuples;

determining confidence probabilities for the additional training examples to achieve an error threshold;

identifying one or more examples of the additional training examples that have a confidence probability above a probability threshold;

obtaining a second set of random tuples from the intermediate query expression, wherein the second set of random tuples does not overlap with the set of random tuples; and updating the approximate labels for the one or more examples of the additional training examples.

15. The method of claim 14, wherein the approximate labels are approximate selectivity labels.

16. The method of claim 11, wherein determining that the model does not satisfy the accuracy target comprises:

determining that a target percentile is less than or equal to a lower bound of a confidence interval.

17. The method of claim 16, wherein the confidence interval is a percentile of predictions of the model that have a q-error less than a target q-error.

18. The method of claim 11, wherein the geometric step size minimizes a total time spent on model construction.

19. The method of claim 11, wherein the instructions being further executable by the one or more processors to:

iteratively increase the size of the set of labeled training examples, wherein the size of the set of labeled training examples is less than or equal to a maximum size of labeled training examples.

20. The method of claim 11, wherein generating the labels for the additional training examples comprises:

obtaining a set of random tuples from an intermediate query expression, wherein the set of random tuples is less than a total number of tuples from the intermediate query expression;

determining approximate labels for the additional training examples based on the set of random tuples; and updating the approximate labels for the one or more examples of the additional training examples.

* * * * *